(12) United States Patent
Wang et al.

(10) Patent No.: US 12,224,548 B2
(45) Date of Patent: Feb. 11, 2025

(54) SINGLE-PHOTON RAMAN OPTICAL FREQUENCY COMB SOURCE

(71) Applicant: UNIVERSITY OF SCIENCE AND TECHNOLOGY OF CHINA, Anhui (CN)

(72) Inventors: Chong Wang, Anhui (CN); Haocheng Yang, Anhui (CN); Xianghui Xue, Anhui (CN); Yudie Li, Anhui (CN); Tingdi Chen, Anhui (CN)

(73) Assignee: UNIVERSITY OF SCIENCE AND TECHNOLOGY OF CHINA, Anhui (CN)

( * ) Notice: Subject to any disclaimer, the term of this patent is extended or adjusted under 35 U.S.C. 154(b) by 0 days.

(21) Appl. No.: 18/716,704

(22) PCT Filed: Apr. 21, 2023

(86) PCT No.: PCT/CN2023/089740
§ 371 (c)(1),
(2) Date: Jun. 5, 2024

(87) PCT Pub. No.: WO2024/216622
PCT Pub. Date: Oct. 24, 2024

(65) Prior Publication Data
US 2024/0421552 A1 Dec. 19, 2024

(51) Int. Cl.
*H01S 3/108* (2006.01)
*H01S 3/00* (2006.01)
(Continued)

(52) U.S. Cl.
CPC .......... *H01S 3/1086* (2013.01); *H01S 3/0078* (2013.01); *H01S 3/0085* (2013.01); *H01S 3/115* (2013.01); *H01S 3/305* (2013.01)

(58) Field of Classification Search
CPC ...... H01S 3/0078; H01S 3/0085; H01S 3/305; H01S 3/1086
See application file for complete search history.

(56) References Cited

U.S. PATENT DOCUMENTS 5,620,571 A * 4/1997 Bahns .................. H05H 3/04
422/186
8,681,827 B2 3/2014 Malecki et al.
(Continued)

FOREIGN PATENT DOCUMENTS

| CN | 102338965 A | 2/2012 |
| CN | 102981345 A | 3/2013 |

(Continued)

OTHER PUBLICATIONS

Cai, Zianglong, et al., "The study of Optical Frequency-comb laser generated by Stimulated Raman Scattering," *Proc. of SPIE*, vol. 11042, 5 pgs. (2019).
(Continued)

*Primary Examiner* — Michael Carter
(74) *Attorney, Agent, or Firm* — Christensen, Fonder, Dardi & Herbert PLLC

(57) ABSTRACT

A single-photon Raman optical frequency comb source is provided, including: a light source assembly, a filtering mechanism, at least three electro-optical modulators, a wavelength division multiplexer and a single photon generating mechanism. The light source assembly is configured to generate a Raman scattering light. The filtering mechanism is configured to pass a light having a specific wavelength, to filter the Raman scattering light and obtain at least three Raman scattering spectral lines. Each electro-optical modulator is configured to modulate a frequency of one of the Raman scattering spectrum lines in one-to-one correspondence, so as to cause a frequency shift of the Raman scattering spectrum line. The wavelength division multi-
(Continued)

plexer is configured to multiplex all modulated Raman scattering spectral lines and output a Raman optical frequency comb. The single photon generating mechanism is configured to adjust the Raman optical frequency comb to obtain a single-photon Raman optical frequency comb.

7 Claims, 2 Drawing Sheets

(51) Int. Cl.
    *H01S 3/115*      (2006.01)
    *H01S 3/30*      (2006.01)

(56) References Cited

U.S. PATENT DOCUMENTS

| | | | |
|---|---|---|---|
| 8,724,204 B2 | 5/2014 | Qiu et al. | |
| 10,050,407 B1 | 8/2018 | Fernandez et al. | |
| 10,666,275 B1 | 5/2020 | Tiemann | |
| 11,658,461 B1* | 5/2023 | Liu | H01S 5/0687 372/18 |
| 2008/0069159 A1 | 3/2008 | Adel et al. | |
| 2011/0007383 A1 | 1/2011 | Gheorma et al. | |
| 2019/0312723 A1* | 10/2019 | Guo | H04L 9/0858 |
| 2021/0242654 A1 | 8/2021 | Tang et al. | |

FOREIGN PATENT DOCUMENTS

| | | |
|---|---|---|
| CN | 103703635 A | 4/2014 |
| CN | 111697426 A | 9/2020 |
| CN | 111969406 A | 11/2020 |
| CN | 114243438 A | 3/2022 |
| CN | 114336227 A | 4/2022 |
| CN | 114825018 A | 7/2022 |
| JP | 2010-101956 A | 5/2010 |

OTHER PUBLICATIONS

Diddams, Scott A., et al., "Optical frequency combs: Coherently uniting the electromagnetic spectrum," *Science*, 369(6501): eaay3676, 13 pages (Jul. 17, 2020).

*Lidar, Range-Resolved Optical Remote Sensing of the Atmosphere*, edited by Claus Weitkamp, pp. 241-252 (published 2005).

* cited by examiner

SINGLE-PHOTON RAMAN OPTICAL FREQUENCY COMB SOURCE

CROSS REFERENCE TO RELATED APPLICATIONS

This application is a Section 371 National Stage Application of International Application No. PCT/CN2023/089740, filed on Apr. 21, 2023, entitled "SINGLE-PHOTON RAMAN OPTICAL FREQUENCY COMB SOURCE", the content of which is incorporated herein by reference in its entirety.

TECHNICAL FIELD

The present disclosure relates to a field of advanced laser light source, and in particular, to a single-photon Raman optical frequency comb source.

BACKGROUND

Raman scattering is a gas scattering phenomenon discovered by Indian physicist Raman in 1928. Raman scattering is a type of inelastic scattering, which means that the frequency of light changes after scattering. Since Raman scattering is too weak, the research related to Raman scattering did not develop rapidly until the emergence of laser. Now it is widely used in component detection, disease diagnosis, drug development, atmospheric detection, etc. One of the important characteristics of Raman scattering is that the frequency shift of scattered light is not affected by the external environment and is only related to the properties of the medium in which scattering occurs. The stable frequency spacing gives Raman scattering light the potential to generate the optical frequency comb.

Optical frequency comb appears as a series of ultrashort pulses in the time domain and as a set of comb lines at equal frequency intervals in the frequency domain, and the intensity of the comb line is related to the envelope of the pulse. The optical frequency comb was originally created for precise optical frequency measurement. With the continuous development of optical frequency comb technology, its applications are gradually broadening. The most mainstream optical frequency comb generation scheme at present is the optical frequency comb generation scheme based on femtosecond mode-locked laser implemented by Hall and Hänsch in 1999, which uses a mode-locked laser to output a periodic pulse sequence in the time domain, and forms an optical frequency comb with equal frequency intervals in the frequency domain. In addition, the high nonlinear fiber dispersion scheme used by Evgeny Myslivets, the cyclic frequency shifting scheme used by Li Jianping, the electro-optical comb scheme used by Motonobu Kourogi, the Kerr comb scheme used by Briles, and the optical microcavity solution used by Kippenberg are also commonly used solutions for generating optical frequency comb.

The application scenarios of optical frequency comb are very wide. For example, the optical frequency comb may achieve high-precision frequency measurement based on the interference principle, the arbitrary waveform generation may be achieved by controlling the parameter of optical frequency comb optical pulse, Coherent heterodyne OCT may be achieved using dual optical comb, the optical frequency comb as the light source of radar may achieve more efficient detection than monochromatic light, etc.

However, as the mainstream solution for generating optical frequency comb, the femtosecond mode-locked laser has many shortcomings. Firstly, the production and operation of femtosecond mode-locked laser are complicated and expensive. Secondly, due to the mode-locking characteristics, the frequency tuning range of femtosecond mode-locked laser is limited and the adjustment is not flexible enough. Finally, due to the existence of nonlinear effects, femtosecond mode-locked laser will be affected by stray light and are sensitive to environmental factors such as temperature and mechanical vibration, which requires complex isolation and stabilization measures.

SUMMARY

One aspect of the present disclosure provides a single-photon Raman optical frequency comb source, which has the characteristic of adjustable frequency comb interval.

In order to achieve the above objective, the embodiments of the present disclosure disclose a single-photon Raman optical frequency comb source, including:
   a light source assembly configured to generate a Raman scattering light;
   a filtering mechanism configured to pass a light having a specific wavelength, so as to filter the Raman scattering light and obtain at least three Raman scattering spectral lines;
   at least three electro-optical modulators, wherein each electro-optical modulator is configured to modulate a frequency of one of the Raman scattering spectrum lines in one-to-one correspondence, so as to cause a frequency shift of the Raman scattering spectrum line;
   a wavelength division multiplexer configured to multiplex all modulated Raman scattering spectral lines and output a Raman optical frequency comb; and
   a single photon generating mechanism configured to adjust the Raman optical frequency comb to obtain a single-photon Raman optical frequency comb.

According to the embodiments of the present disclosure, the light source assembly includes:
   a laser configured to emit a laser; and
   a gas cavity filled with a gas, wherein the laser is incident on gas molecules of the gas and Raman scattering occurs, so as to obtain an initial Raman scattering light;
   wherein the filtering mechanism is configured to receive a transverse Raman scattering light of the initial Raman scattering light output from the gas cavity, and a transmission direction of the transverse Raman scattering light is perpendicular to a transmission direction of the laser.

According to the embodiments of the present disclosure, determining the light having the specific wavelength includes:
   determining the light having the specific wavelength according to a differential scattering cross section of the gas and an anti-Stokes Raman frequency shift of the gas.

According to the embodiments of the present disclosure, the differential scattering cross section of the gas is expressed by:

$$\left(\frac{d\sigma}{d\Omega}\right)_J^{RR,VRR} = \frac{112\pi^4}{15} \frac{g(J)hcB_0(\nu_0 + \Delta\nu(J))^4\gamma^2}{(2I+1)^2 k_B T} X(J)\exp\left[-\frac{E_{rot}(J)}{k_B T}\right]$$

where J represents a rotational quantum number of the gas molecules, J=2, 3, 4 . . . , $$\left(\frac{d\sigma}{d\Omega}\right)_J^{RR,VRR}$$

represents a differential scattering cross section of the gas, g(J) represents a nuclear spin statistical weight of the gas molecules, h represents a Planck constant, c represents a speed of light in vacuum, $v_0$ represents a wave number of the laser, γ represents an anisotropy parameter of polarization intensity of the gas molecules, I represents a nuclear spin quantum number of the gas molecules, $k_B$ represents a Boltzmann constant, T represents a temperature, X(J) represents a rotational transition square matrix, $E_{rot}(J)$ represents a rotational energy of the gas molecules, Δv(J) represents an anti-Stokes frequency shift of the gas, and $B_0$ represents a rotation constant of the gas molecules, the anti-Stokes Raman frequency shift of the gas is expressed by:

$$\Delta v(J) = 2B_0(2J-1) - D_0[3(2J-1)+(2J-1)^3];$$

where $D_0$ represents a centrifugal distortion constant of the gas molecules.

According to the embodiments of the present disclosure, the single photon generating mechanism includes:

a beam splitter configured to divide the Raman optical frequency comb into a signal light and a verification light;

an attenuator configured to control an attenuation of the signal light, so that the signal light output by the attenuator reaches a single photon level, so as to obtain the single-photon Raman optical frequency comb; and a power meter configured to detect a power of the verification light, so as to determine that the signal light reaches the single photon level.

According to the embodiments of the present disclosure, the filtering mechanism is a wavelength division demultiplexer or a grating.

According to the embodiments of the present disclosure, the electro-optical modulator is further configured to modulate an intensity of one of the Raman scattering lines in a one-to-one correspondence.

According to the embodiments of the present disclosure, the Raman optical frequency comb is obtained by using the filtering mechanism to filter the Raman scattering light generated by the light source assembly, and using the electro-optical modulator to perform frequency shift on the filtered Raman scattering spectral line. The frequency interval between the filtered Raman scattering spectral lines may be freely adjusted by using the electro-optical modulator. The formed Raman optical frequency comb may be a Raman optical frequency comb with equal frequency intervals, or other Raman light source with non-equal frequency intervals.

Figure 1:
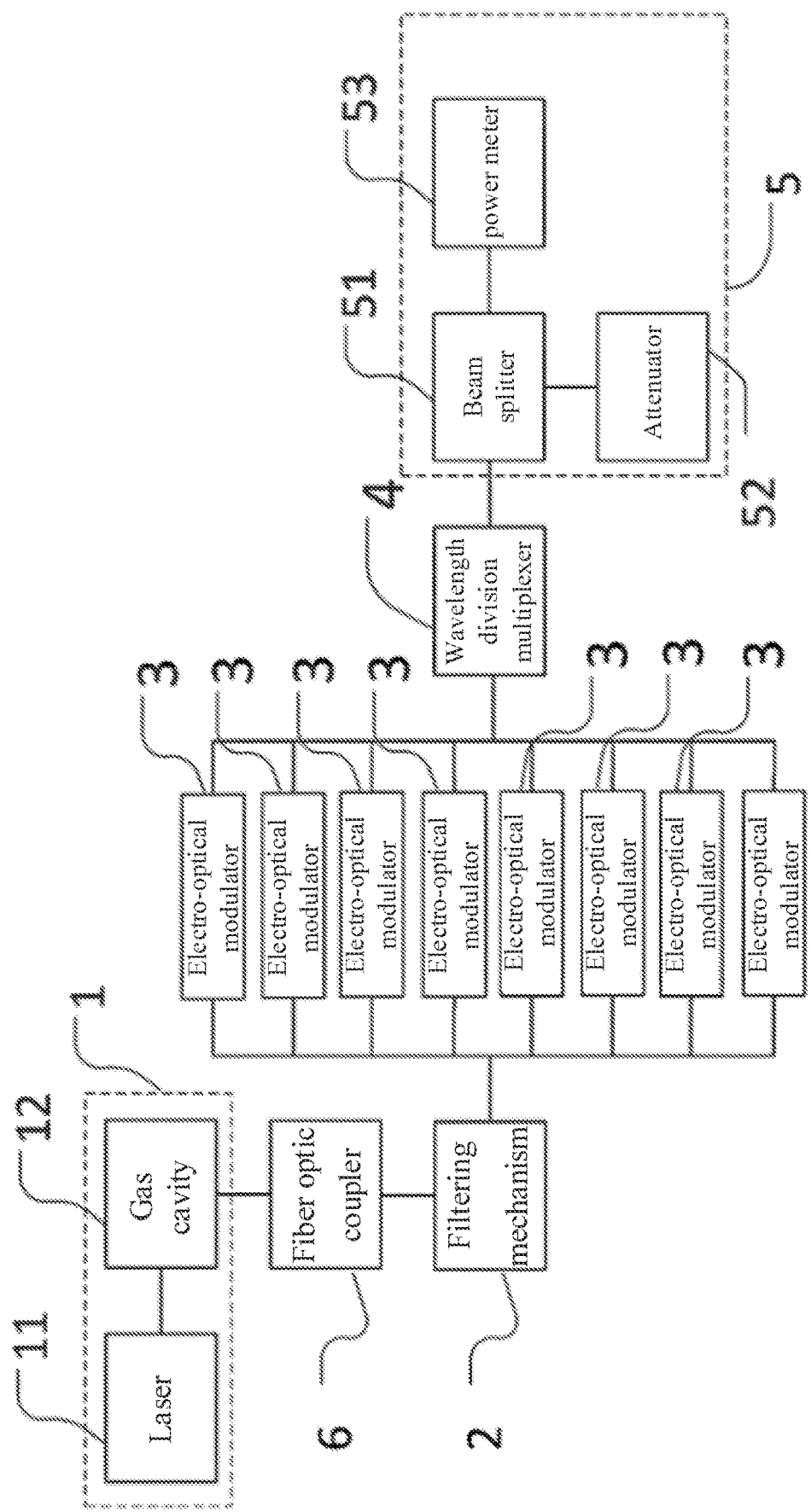
FIG. 1 shows a structural block diagram of a single-photon Raman optical frequency comb source provided according to the embodiments of the present disclosure.

REFERENCE SIGNS 1. light source assembly
11. laser
12. gas cavity
2. filtering mechanism
3. electro-optical modulator
4. wavelength division multiplexer
5. single photon generating mechanism
51. beam splitter
52. attenuator
53. power meter
6. fiber collimator

DETAILED DESCRIPTION OF EMBODIMENTS

In the process of implementing the present disclosure, it is discovered that in 1975, Hoskins used a laser to incident a nitrogen gas cavity, excited and observed a discrete Raman scattering spectrum. However, due to the instrument conditions at the time, it was impossible to use Raman scattering light as an optical frequency comb source. Nowadays, with the development of technologies such as wavelength division multiplexer and electro-optical modulator, it is possible to use Raman scattering light as an optical frequency comb source, which is not only qualified for the application scenarios of optical frequency comb, but also may improve many shortcomings of traditional optical frequency comb generation schemes.

In order to make the purpose, technical solutions and advantages of the present disclosure clearer, the present disclosure will be further described in detail below in conjunction with specific embodiments and with reference to the drawings.

FIG. 1 shows a structural block diagram of a single-photon Raman optical frequency comb source provided according to the embodiments of the present disclosure.

As shown in FIG. 1, the single-photon Raman optical frequency comb source includes: a light source assembly 1, a filtering mechanism 2, at least three electro-optical modulators 3, a wavelength division multiplexer 4 and a single photon generating mechanism 5.

The light source assembly 1 is configured to generate a Raman scattering light. The filtering mechanism 2 is configured to pass a light having a specific wavelength, so as to filter the Raman scattering light and obtain at least three Raman scattering spectral lines. Each of the at least three electro-optical modulators 3 is configured to modulate one of the Raman scattering spectrum lines in one-to-one correspondence, so as to cause a frequency shift of the Raman scattering spectrum line. The wavelength division multiplexer 4 is configured to multiplex all modulated Raman scattering spectral lines and output a Raman optical frequency comb. The single photon generating mechanism 5 is configured to adjust the Raman optical frequency comb to obtain a single-photon Raman optical frequency comb.

According to the embodiments of the present disclosure, the Raman scattering light generated by the light source assembly 1 is filtered by using the filtering mechanism, and then the electro-optical modulator 3 is used to perform frequency shift on the filtered Raman scattering spectral line, thereby obtaining a Raman optical frequency comb. The frequency interval between the filtered Raman scattering spectral lines may be freely adjusted by using the electro-optical modulator 3. The formed Raman optical frequency comb may be a Raman optical frequency comb with equal frequency intervals, or may be a Raman optical frequency comb with non-equal frequency intervals. When the electro-optical modulator 3 adjusts the frequency interval between the filtered Raman scattering spectral lines so that the frequency interval between any two adjacent Raman scattering spectral lines is equal, the output spectrum of the wavelength division multiplexer 4 is a pulse light with equal frequency intervals, that is, a Raman optical frequency comb with equal frequency intervals is formed.

According to the embodiments of the present disclosure, the light source assembly 1 includes: a laser 11 and a gas cavity 12. The laser 11 is configured to emit a laser. The gas cavity 12 is filled with gas, and the laser is incident on gas molecules of the gas and Raman scattering occurs, so as to obtain an initial Raman scattering light. The filtering mechanism 2 is configured to receive a transverse Raman scattering light of the initial Raman scattering light output from a sidewall of the gas cavity, and a transmission direction of the transverse Raman scattering light is perpendicular to a transmission direction of the laser.

According to the embodiments of the present disclosure, the transverse Raman scattering light is easy to align when collecting, that is, the transverse Raman scattering light is easy to collect and is less affected by the original laser.

According to the embodiments of the present disclosure, compared to the method of using the femtosecond mode-locked laser to generate Raman scattering light, the present disclosure uses an ordinary laser and a gas cavity to generate a light source, which is low-cost and easy to operate.

According to the embodiments of the present disclosure, determining the light having a specific wavelength includes: determining the light having a specific wavelength based on a differential scattering cross section of the gas and an anti-Stokes Raman frequency shift of the gas. Specifically, the method of determining the light having a specific wavelength is as follows.

In the embodiments of the present disclosure, the specific wavelength is selected based on the differential scattering cross section of the gas. The embodiments of the present disclosure achieve filtering for the required Raman scattering spectral line by selecting a larger value in the differential scattering cross section of the gas. The differential scattering cross section of the gas is expressed by:

$$\left(\frac{d\sigma}{d\Omega}\right)_J^{RR,VRR} = \frac{112\pi^4}{15} \frac{g(J)hcB_0(v_0 + \Delta v(J))^4 \gamma^2}{(2I+1)^2 k_B T} X(J)\exp\left[-\frac{E_{rot}(J)}{k_B T}\right] \quad (1)$$

where J represents a rotational quantum number of the gas molecules, J=2, 3, 4 . . . , $\left(\frac{d\sigma}{d\Omega}\right)_J^{RR,VRR}$ represents a differential scattering cross section of the gas, g(J) represents a nuclear spin statistical weight of the gas molecules, h represents a Planck constant, c represents a speed of light in vacuum, $v_0$ represents a wave number of the laser, $\gamma$ represents an anisotropy parameter of polarization intensity of the gas molecules, I represents a nuclear spin quantum number of the gas molecules, $k_B$ represents a Boltzmann constant, T represents a temperature, X(J) represents a rotational transition square matrix, $E_{rot}(J)$ represents a rotational energy of the gas molecules, $\Delta v(J)$ represents an anti-Stokes frequency shift of the gas, $B_0$ represents a rotation constant of the gas molecules, and $D_0$ represents a centrifugal distortion constant of the gas molecules.

The anti-Stokes Raman frequency shift of the gas is expressed by:

$$\Delta v(J) = 2B_0(2J-1) - D_0[3(2J-1) + (2J-1)^3] \quad (2)$$

It may be seen from equations (1) to (2) that the differential scattering cross section of gas is determined by a rotational quantum number of the gas molecules. Therefore, the Raman scattering spectral line with a larger differential scattering cross section of the gas may be filtered by filtering the rotational quantum number of the gas molecules.

When the laser is incident on the gas molecules and Raman scattering occurs, according to equation (1), the rotational quantum number when the differential scattering cross section is large is filtered. After that, the anti-Stokes Raman frequency shift of the laser corresponding to each rotational quantum number of the filtered gas molecules may be calculated according to equation (2). Since the frequency of the laser is known, the frequency of the filtered Raman scattering spectral line may be calculated according to equations (1) to (2). According to the embodiments of the present disclosure, each electro-optical modulator 3 may be set as needed, so that the frequency interval between the filtered Raman scattering spectral lines may be freely adjusted. The formed Raman optical frequency comb may be a Raman optical frequency comb with equal frequency intervals, or a Raman optical frequency comb with non-equal frequency intervals.

According to the embodiments of the present disclosure, the single photon generating mechanism includes: a beam splitter 51, an attenuator 52 and a power meter 53.

The beam splitter 51 is configured to divide the Raman optical frequency comb into a signal light and a verification light. The attenuator 52 is configured to control an attenuation of the signal light, so that the signal light output by the attenuator reaches a single photon level, so as to obtain the single-photon Raman optical frequency comb. The power meter 53 is configured to detect a power of the verification light, so as to determine that the signal light reaches the single photon level.

According to the embodiments of the present disclosure, the filtering mechanism 2 is a wavelength division demultiplexer or a grating.

According to the embodiments of the present disclosure, the single-photon Raman optical frequency comb source further includes: a fiber collimator 6 configured to couple the Raman scattering light and transmit the coupled Raman scattering light to the filtering mechanism 2.

According to the embodiments of the present disclosure, the fiber collimator 6 and the filtering mechanism 2 are connected through an optical fiber, the filtering mechanism 2 and the electro-optical modulator 3 are connected through an optical fiber, the electro-optical modulator 3 and the wavelength division multiplexer 4 are connected through an optical fiber, and the wavelength division multiplexer 4 and the single photon generating mechanism 5 are connected through an optical fiber.

According to the embodiments of the present disclosure, the electro-optical modulator is configured to modulate the frequency of a Raman scattering line in one-to-one correspondence. The modulation process may not only change the frequency of the spectral line, but also change the intensity of the spectral line, which provides a high degree of freedom. The gas is nitrogen, and may also be other gases.

According to the embodiments of the present disclosure, the beam splitter is a 99:1 beam splitter. By using the 99:1 beam splitter, 1% of the energy is delivered to the attenuator, which introduces 20 dB of attenuation in advance. There is no need to use an overly high-performance attenuator, which saves costs.

The following is a detailed description of the method of generating a single-photon Raman optical frequency comb using the single-photon Raman optical frequency comb source provided by the embodiments of the present disclosure.

The laser output from the laser 11 is incident on the gas cavity 2 to generate the initial Raman scattering light. Since the gas in this embodiment is nitrogen, the gas cavity 2 in this embodiment is a nitrogen gas cavity. The transverse Raman scattering light emitted from the nitrogen gas cavity is incident on an input end of the fiber collimator 6, and an output end of the fiber collimator 6 is connected to an input end of the wavelength division demultiplexer. The fiber collimator 6 is configured to couple the initial Raman laser to the wavelength division demultiplexer, so as to obtain the Raman scattering spectral line having a specific wavelength.

Figure 2:
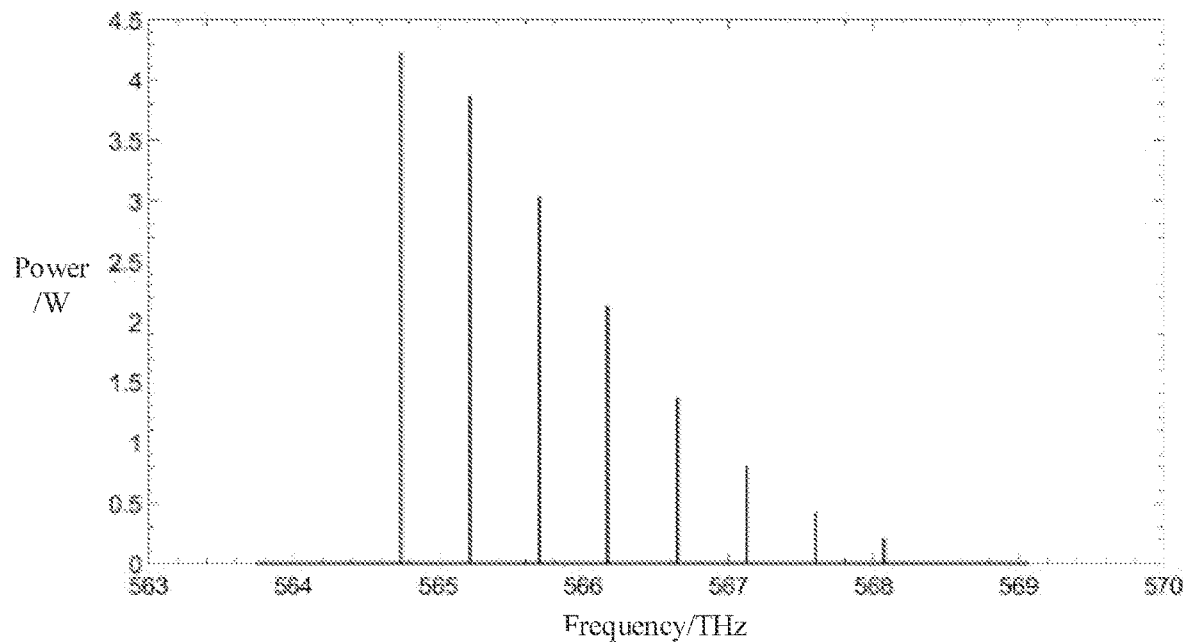
FIG. 2 shows a signal spectrum diagram of Raman scattering of nitrogen molecules filtered by a filtering mechanism provided according to the embodiments of the present disclosure.

Since the gas in this embodiment is nitrogen, $B_0=1.9895$ cm$^{-1}$, $D_0=5.48\times10^{-6}$ cm$^{-1}$ may be obtained by combining equations (1) to (2). The eight Raman scattering spectral lines with rotational quantum numbers J=6, 8, 10, 12, 14, 16, 18, and 20 have larger differential scattering cross sections and larger frequency shifts, which are easier to split and are therefore suitable for practical application. This embodiment takes the eight spectral lines as an example. At the same height, the spectral line intensity is proportional to the differential scattering cross section. According to the above equations, the Raman scattering signal spectrum of nitrogen may be simulated. The signal spectrum of Raman scattering of nitrogen molecules filtered by filtering mechanism 2 is shown in FIG. 2.

Since there are eight filtered Raman scattering spectral lines, there are eight corresponding electro-optical modulators 3. The eight output terminals of the wavelength division demultiplexer are sequentially connected to eight electro-optical modulators 3 through optical fibers. That is, the eight output terminals of the wavelength division demultiplexer are connected to input ends of electro-optic modulator EOM5, electro-optic modulator EOM6, electro-optic modulator EOM7, electro-optic modulator EOM8, electro-optic modulator EOM9, electro-optic modulator EOM10, electro-optic modulator EOM11 and electro-optic modulator EOM12 through optical fibers. The eight electro-optical modulators 3 each implement modulation of the frequency of the corresponding one Raman scattering spectrum line, so that the Raman scattering spectrum line undergoes the frequency shift. Output ends of electro-optic modulator EOM5, electro-optic modulator EOM6, electro-optic modulator EOM7, electro-optic modulator EOM8, electro-optic modulator EOM9, electro-optic modulator EOM10, electro-optic modulator EOM11 and electro-optic modulator EOM12 are sequentially connected to the eight input ends of the wavelength division multiplexer 4 through optical fibers. The output end of the wavelength division multiplexer 4 is connected to the input end of the beam splitter 51. The beam splitter 51 divides the Raman optical frequency comb output by the wavelength division multiplexer 4 into a verification light and a signal light. The verification light is connected to the power meter 15 through an optical fiber, and the signal light is connected to the input end of the attenuator 16 through an optical fiber.

A laser of 532 nm wavelength is used to incident to the nitrogen, the wavelengths of the eight spectral lines of J=6, 8, 10, 12, 14, 16, 18, and 20 are respectively 530.8496 nm, 530.4018 nm, 529.9550 nm, 529.5091 nm, 529.0644 nm, 528.6208 nm, 528.1785 nm, and 527.7373 nm, and the corresponding frequencies are 564.7409 THz, 565.2176 THz, 565.6942 THz, 566.1705 THz, 566.6464 THz, 567.1219 THz, 567.5969 THz, and 568.0714 THz. A wavelength division demultiplexer with center wavelengths of the above wavelengths is used to separate the eight signals and connect to eight electro-optical modulators 3 respectively. The electro-optic modulator causes the eight signals to generate frequency shifts of 259.1431 GHZ, 282.3518 GHZ, 305.8222 GHz, 329.4507 GHz, 353.5615 GHz, 378.0517 GHz, 403.1402 GHz, and 428.6168 GHz respectively. In this way, after passing through the wavelength division multiplexer with center frequencies of 565 THz, 565.5 THz, 566 THz, 566.5 THz, 567 THz, 567.5 THz, 568 THz, and 568.5 THz, the spectrum of the output light is pulses with equal frequency intervals, which forms an optical frequency comb. Then through the 99:1 beam splitter, 99% of the energy is delivered to the power meter to monitor the power, and 1% of the energy is delivered to the 100 dB attenuator, and the final energy is attenuated to $10^{-12}$ of original, so as to obtain a single-photon Raman optical frequency comb.

According to the embodiments of the present disclosure, an ordinary laser 11 and a gas cavity 12 are used to generate laser, which is low-cost and easy to operate. By using the electro-optical modulator 3, the frequency and intensity of the Raman spectral line may be freely adjusted, thereby solving the problem of limited frequency tuning of femtosecond mode-locked laser. The eight Raman spectral lines are filtered through the wavelength division demultiplexer to filter out stray light. Since the Raman scattering frequency shift of gas has nothing to do with external conditions, the output of the single-photon Raman optical frequency comb source is very stable and will not be affected by external conditions.

Raman scattering is produced when the laser excites nitrogen molecules, while Stokes and anti-Stokes components are existed. The anti-Stokes component is more widely used. Therefore, the anti-Stokes scattering of nitrogen at 300K is simulated in this embodiment.

Figure 3:
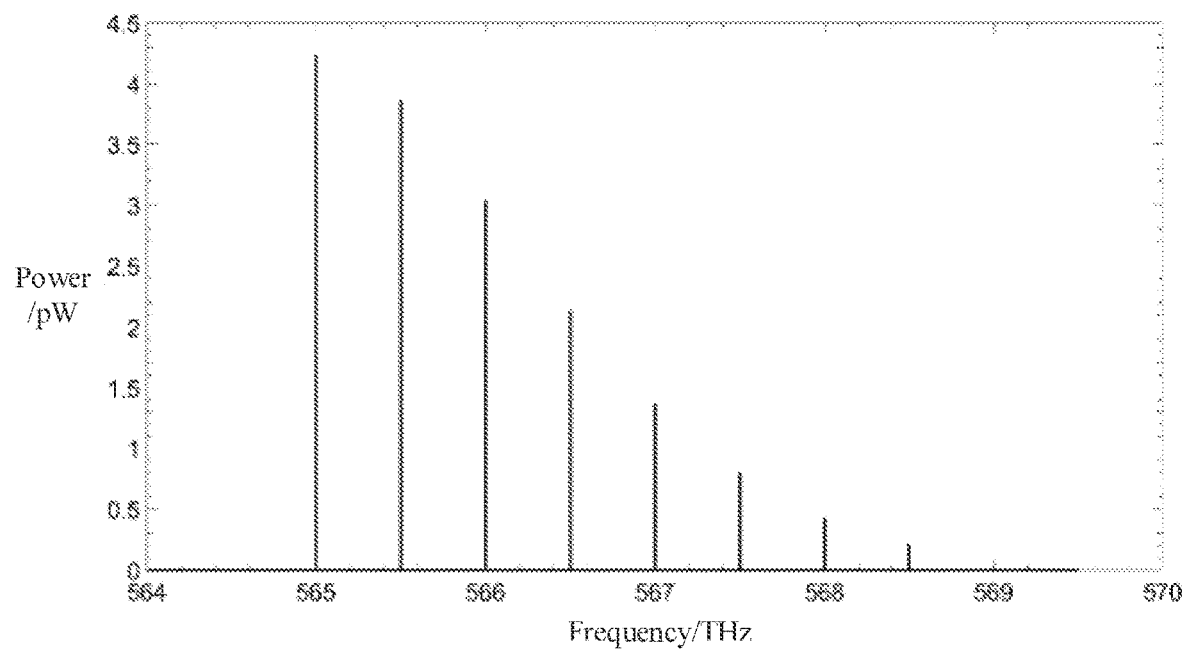
FIG. 3 shows a spectrum diagram of a generated single-photon Raman optical frequency comb provided according to the embodiments of the present disclosure.

FIG. 3 shows a spectrum diagram of a generated single-photon Raman optical frequency comb provided according to the embodiments of the present disclosure.

As shown in FIG. 3, a laser of 532 nm wavelength is used to incident to the nitrogen, the wavelengths of the eight spectral lines of J=6, 8, 10, 12, 14, 16, 18, and 20 are respectively 530.8496 nm, 530.4018 nm, 529.9550 nm, 529.5091 nm, 529.0644 nm, 528.6208 nm, 528.1785 nm, and 527.7373 nm, and the corresponding frequencies are 564.7409 THz, 565.2176 THz, 565.6942 THz, 566.1705 THz, 566.6464 THz, 67.1219 THz, 67.5969 THz, and 568.0714 THz. A wavelength division demultiplexer with center wavelengths of the above wavelengths is used to separate the eight signals and connect to eight electro-optical modulators respectively. The electro-optic modulator causes the eight signals to generate frequency shifts of 259.1431 GHz, 282.3518 GHz, 305.8222 GHz, 329.4507 GHz, 353.5615 GHz, 378.0517 GHz, 403.1402 GHz, and 428.6168 GHz respectively. In this way, after passing through the wavelength division multiplexer with center frequencies of 565 THz, 565.5 THz, 566 THz, 566.5 THz, 567 THz, 567.5 THz, 568 THz, and 568.5 THz, the spectrum of the output light is pulses with equal frequency intervals, which forms an optical frequency comb. Then through the 99:1 beam splitter, 99% of the energy is delivered to the power meter to monitor the power, and 1% of the energy is delivered to the 100 dB attenuator, and the final energy is attenuated to $10^{-12}$ of original, so as to obtain a single-photon Raman optical frequency comb.

The single-photon Raman optical frequency comb source provided according to the embodiments of the present disclosure simplifies the way of generating optical frequency comb. A mode-locked laser is no longer needed. Only an ordinary laser is needed to generate an optical frequency comb with stable frequency intervals.

The frequency spacing and intensity may be freely adjusted through the electro-optical modulator according to the single-photon Raman optical frequency comb source provided by the embodiments of the present disclosure. The optical frequency comb with equal frequency intervals may be formed, or other light sources with non-equal frequency intervals.

According to the single-photon Raman optical frequency comb source provided by the embodiments of the present disclosure, the properties of the single-photon Raman optical frequency comb are related to the properties of the gas used for excitation scattering, which may provide a reference for studying gas properties.

The intensity of the single-photon Raman optical frequency comb provided by the single-photon Raman optical frequency comb source according to the embodiments of the present disclosure is on the level of single photon, which is very suitable for quantum interference-related applications.

The specific embodiments described above further illustrate the objects, technical solutions and beneficial effects of the present disclosure in detail. It should be understood that the above descriptions are only specific embodiments of the present disclosure and are not construed as limiting the present disclosure. Any modifications, equivalent replacements and improvements made within the spirit and principles of the present disclosure shall be contained in the scope of protection of the present disclosure.

What is claimed is:

1. A single-photon Raman optical frequency comb source, comprising:
    a light source assembly configured to generate a Raman scattering light;
    a filtering mechanism configured to pass a light having a specific wavelength, so as to filter the Raman scattering light and obtain at least three Raman scattering spectral lines;
    at least three electro-optical modulators, wherein each electro-optical modulator is configured to modulate a frequency of one Raman scattering spectrum line of the at least three Raman scattering spectrum lines in one-to-one correspondence, so as to cause a frequency shift of the Raman scattering spectrum line;
    a wavelength division multiplexer configured to multiplex all modulated Raman scattering spectral lines and output a Raman optical frequency comb; and
    a single photon generating mechanism configured to adjust the Raman optical frequency comb to obtain a single-photon Raman optical frequency comb.

2. The single-photon Raman optical frequency comb source according to claim 1, wherein the light source assembly comprises:
    a laser configured to emit a laser beam; and
    a gas cavity filled with gas, wherein the laser beam is incident on gas molecules of the gas and Raman scattering occurs, so as to obtain an initial Raman scattering light;

wherein the filtering mechanism is configured to receive a transverse Raman scattering light of the initial Raman scattering light output from the gas cavity, and a transmission direction of the transverse Raman scattering light is perpendicular to a transmission direction of the laser beam.

3. The single-photon Raman optical frequency comb source according to claim 2, wherein determining the light having the specific wavelength comprises:
    determining the light having the specific wavelength according to a differential scattering cross section of the gas and an anti-Stokes Raman frequency shift of the gas.

4. The single-photon Raman optical frequency comb source according to claim 3, wherein the differential scattering cross section of the gas is expressed by:

$$\left(\frac{d\sigma}{d\Omega}\right)_J^{RR,VRR} = \frac{112\pi^4}{15} \frac{g(J)hcB_0(v_0+\Delta v(J))^4 \gamma^2}{(2I+1)^2 k_B T} X(J)\exp\left[-\frac{E_{rot}(J)}{k_B T}\right]$$

where J represents a rotational quantum number of the gas molecules, J=2, 3, 4 . . . , $$\left(\frac{d\sigma}{d\Omega}\right)_J^{RR,VRR}$$

represents a differential scattering cross section of the gas, g(J) represents a nuclear spin statistical weight of the gas molecules, h represents a Planck constant, c represents a speed of light in vacuum, $v_0$ represents a wave number of the laser, $\gamma$ represents an anisotropy parameter of polarization intensity of the gas molecules, I represents a nuclear spin quantum number of the gas molecules, $k_B$ represents a Boltzmann constant, T represents a temperature, X(J) represents a rotational transition square matrix, $E_{rot}(J)$ represents a rotational energy of the gas molecules, $\Delta v(J)$ represents an anti-Stokes frequency shift of the gas, and $B_0$ represents a rotation constant of the gas molecules, the anti-Stokes Raman frequency shift of the gas is expressed by:

$$\Delta v(J)=2B_0(2J-1)-D_0[3(2J-1)+(2J-1)^3];$$

where $D_0$ represents a centrifugal distortion constant of the gas molecules.

5. The single-photon Raman optical frequency comb source according to claim 2, wherein the gas is nitrogen;
    the electro-optical modulator is further configured to modulate an intensity of the Raman scattering line in one-to-one correspondence.

6. The single-photon Raman optical frequency comb source according to claim 1, wherein the single photon generating mechanism comprises:
    a beam splitter configured to divide the Raman optical frequency comb into a signal light and a verification light;
    an attenuator configured to control an attenuation of the signal light, so that the signal light output by the attenuator reaches a single photon level, so as to obtain the single-photon Raman optical frequency comb; and
    a power meter configured to detect a power of the verification light, so as to determine that the signal light reaches the single photon level.

7. The single-photon Raman optical frequency comb source according to claim 1, wherein the filtering mechanism is a wavelength division demultiplexer or a grating.

* * * * *